(12) United States Patent
Vella-Coleiro

(10) Patent No.: US 6,721,298 B1
(45) Date of Patent: Apr. 13, 2004

(54) TECHNIQUE FOR EFFECTIVELY UTILIZING BANDWIDTH OF A CABLE NETWORK FOR WIRELESS COMMUNICATIONS

(75) Inventor: George Philip Vella-Coleiro, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/042,478

(22) Filed: Mar. 16, 1998

(51) Int. Cl.[7] .............................. H04B 1/40; H04B 7/216
(52) U.S. Cl. ......................................... 370/342; 455/75
(58) Field of Search ................................ 370/295, 488, 370/485, 486, 487, 497, 342; 455/5.1, 75, 161.2, 164.2; 375/295

(56) References Cited

U.S. PATENT DOCUMENTS

| | | | | |
|---|---|---|---|---|
| 4,272,743 A | * | 6/1981 | Evans ........................ 333/176 |
| 4,321,706 A | * | 3/1982 | Craft ........................... 375/59 |
| 4,551,755 A | * | 11/1985 | Matsuda et al. ............. 358/188 |
| 4,619,000 A | * | 10/1986 | Ma .............................. 455/131 |
| 4,920,533 A | * | 4/1990 | Dufresne et al. ........... 370/85.2 |
| 5,126,840 A | * | 6/1992 | Dufresne ..................... 358/86 |
| 5,263,185 A | * | 11/1993 | Bush ........................ 455/226.3 |
| 5,511,235 A | * | 4/1996 | Duong et al. ................. 455/75 |
| 5,590,182 A | * | 12/1996 | Stevens et al. ............. 379/130 |
| 5,812,928 A | * | 9/1998 | Watson, Jr. et al. ......... 455/5.1 |
| 5,828,946 A | * | 10/1998 | Feisullin et al. ............. 455/5.1 |
| 5,937,330 A | * | 8/1999 | Vince et al. ................. 455/5.1 |
| 5,970,386 A | * | 10/1999 | Williams .................... 455/4.1 |

* cited by examiner

*Primary Examiner*—Alpus H. Hsu
*Assistant Examiner*—Toan D. Nguyen

(57) ABSTRACT

In a cable network for delivering a personal communications service (PCS) and cable television (CATV) service, return service applications, e.g., a pay per view service, are also provided on a return cable band provided by the cable network. In accordance with the invention, the return service applications utilize subbands unused by the PCS in the return cable band, thereby unaffecting the PCS. The broadband noise in the subbands normally accompanied by the PCS is filtered out using a tunable filter whose passband is adjustable to coincide with one of many PCS signal bands being used in the return cable band.

25 Claims, 2 Drawing Sheets

TECHNIQUE FOR EFFECTIVELY UTILIZING BANDWIDTH OF A CABLE NETWORK FOR WIRELESS COMMUNICATIONS

FIELD OF THE INVENTION

The invention relates to communications systems and methods, and more particularly to a system and method for wireless communications using bandwidth of a cable network.

BACKGROUND OF THE INVENTION

Because of the popularity of cable television (CATV), cable networks for transporting CATV signals to CATV subscriber premises proliferate at a rapid pace. Taking advantage of the broad band provided by a cable network, telephone companies deliver wireless telephony services, e.g., a personal communications service (PCS), through the network. For example, the cable network affords a communication medium between a base station and cable microcell integrators (CMIs) connected thereto for providing the PCS. A CMI is typically mounted on a cable trunk in the cable network, and includes antennas for transmitting and receiving in a wireless manner communication information to and from mobile terminals, e.g., radiotelephones, subscribing to the PCS. The base station performs call administration, and establishes and maintains telephone connections between the mobile terminals and other communication terminals, which may or may not be mobile terminals, via, e.g., a public switched telephone network (PSTN).

After a telephone connection is established between a communication terminal and a mobile terminal, the base station generates a transmit signal representative of digital information from the communication terminal, in accordance with the PCS standard and a well known multiple access technique, e.g., a code division multiple access (CDMA) technique. The base station sends the transmit signal, through a forward cable band (450 MHz–750 MHz) provided by the cable network, to the CMIs where the digital information is transmitted to the mobile terminal. In the reverse direction, the CMIs receive digital information from the mobile terminal, and send multiple reverse PCS CDMA signals containing the received information, through a return cable band (5 MHz–42 MHz) provided by the cable network, to the base station where the information is transmitted to the communication terminal, thereby realizing duplex communications.

Recently, a number of applications emerged, known as "return service applications," which need to also utilize the return cable band to provide, e.g., pay per view services, Internet access, interactive games, etc. Although the reverse PCS CDMA signals do not fully populate the 5 MHz–42 MHz return cable band, thus leaving unused bandwidth therein, the return service applications, however, cannot take advantage of such unused bandwidth as the whole return cable band is corrupted by broadband noise entering through the CMIs.

An effort has been made to make available bandwidth in the return cable band to accommodate the return service applications. This effort involves use of a bandpass filter to limit the band for the reverse PCS CDMA signals to only 5 MHz through 18 MHz, thereby affording the remaining return cable band 18 MHz through 42 MHz to the return service applications. However, such an effort is ineffective as the return service applications are accommodated at the expense of the PCS, thereby adversely affecting the PCS.

Accordingly, there exists a need for a methodology for effectively locating bandwidth in a return cable band of a cable network for return service applications, without adversely affecting the PCS.

SUMMARY OF THE INVENTION

I have recognized that because of use of the CDMA technique in the PCS described above, even though the reverse PCS communication is active, the power spectrum of the reverse CDMA PCS signals, including their power level, resemble that of pure channel noise as if no communication were going on. In other words, a pure-channel-noise-like signal, referred to as a "pedestal noise signal," always appears in a signal band being used for the PCS in the return cable band, regardless of whether the reverse PCS communication is active. I have also recognized that the power level of the pedestal noise signal is significantly higher than that of the broadband noise corrupting the return cable band.

Thus, in accordance with the invention, the pedestal noise signal is detected to identify the signal band being used for the PCS. Such detection may be based on a significant rise in the power level in a transition from the broadband noise to the pedestal noise signal in the return cable band. A tunable filter is used, whose passband is controllably adjusted to cover the identified signal band, to filter out the noise in the rest of the return cable band.

Advantageously, with the invention, the bandwidth unused by the PCS in the return cable band, which is noise-free, can be allocated to the return service applications, without affecting the PCS.

DETAILED DESCRIPTION

Figure 1:
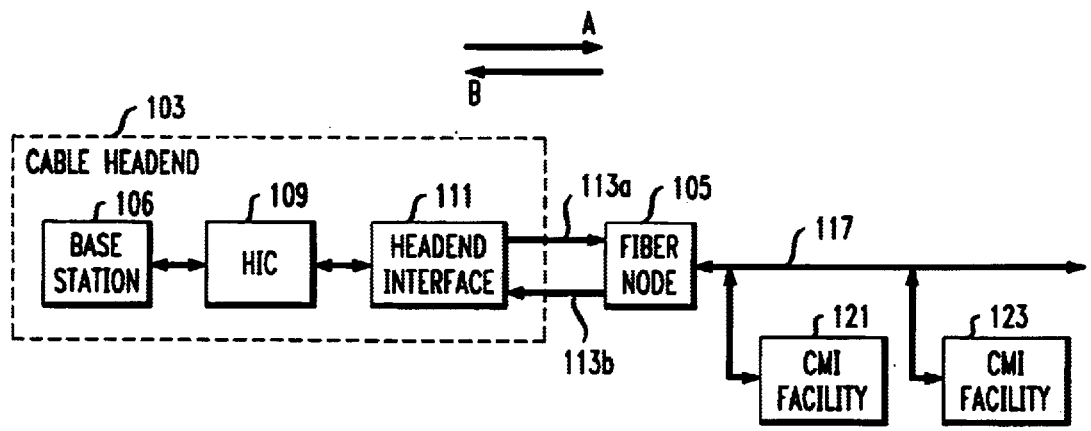
FIG. 1 is a block diagram of a cable network arrangement in accordance with the invention.

FIG. 1 illustrates cable network arrangement 100 embodying the principles of the invention for delivering a wireless telephony service, e.g., a personal communications service (PCS) in this instance, and return service applications described below in addition to a conventional cable television (CATV) service.

In FIG. 1, cable headend 103 is connected to cable microcell integrator (CMI) facilities 121 and 123 through a hybrid fiber cable (HFC) plant, including optical fibers 113a and 113b, fiber node 105 and coaxial cable 117. CMI facilities 121 and 123 in accordance with the invention are fully described below. However, it suffices to know for now that facilities 121 and 123 are mounted on cable 117, and include antennas for transmitting and receiving in a wireless manner communication information to and from mobile terminals, e.g., radiotelephones, within a pre-defined geographic coverage. As is well known, a PCS service area is divided into a multiplicity of cells, and each cell typically is further divided into a number of sectors. Although arrangement 100 may be used to serve mobile terminals in one such cell, without loss of generality, only the components in arrangement 100 corresponding to the service of one such sector in the cell are shown in FIG. 1. Thus, the aforementioned pre-defined geographic coverage in this instance is such a sector.

Headend 103 includes base station 106 which, in a well known manner, performs call administration, and establishes and maintains telephone connections between the mobile terminals and other communication terminals, which may or may not be mobile terminals, via, e.g., a public switched telephone network (PSTN). After a telephone connection is established between a communication terminal (not shown) and a mobile terminal (not shown), base station 106 provides to headend interface converter (HIC) 109 a transmit signal containing digital information from the communication terminal, in accordance with the PCS standard and well known code division multiple access (CDMA) technique. The transmit signal occupies a bandwidth of 1.25 MHz in a transmit PCS band ranging from 1930 MHz to 1990 MHz.

In accordance with the CDMA technique, the transmit signal represents digital bits which are subdivided into a number of sub-elements called "chips" such that the bits generated in base station 106 in each telephone connection have an assigned bit pattern. By virtue of the CDMA technique, the power spectrum of the transmit signal resembles that of noise in the PCS band as if no communications were going on. However, knowing the assigned bit pattern a priori, each intended mobile terminal is capable of recovering the digital bits based on the known bit pattern, thus allowing multiple simultaneous connections to be effected on the same communication medium.

In a conventional manner, the transmit signal from base station 106 is frequency-translated by HIC 109 to populate a CATV channel allocated thereto in a forward cable band ranging from 450 MHz to 750 MHz. The frequency-translated signal hereinafter is referred to as the "forward PCS CDMA signal." Headend interface 111 receives, among others, the forward PCS CDMA signal from HIC 109, and CATV signals from satellites which populate other CATV channels for distribution to CATV subscriber premises. Interface 111 combines the received signals to form a composite radio frequency (RF) signal, used to modulate an optical signal generated by a laser transmitter (not shown) therein. In forward direction A, the modulated optical signal traverses optical fiber 113a extending to fiber node 105. The latter converts the optical signal back to the composite RF signal which includes the aforementioned forward PCS CDMA signal, and which is sent onto coaxial cable 117.

Figure 2:
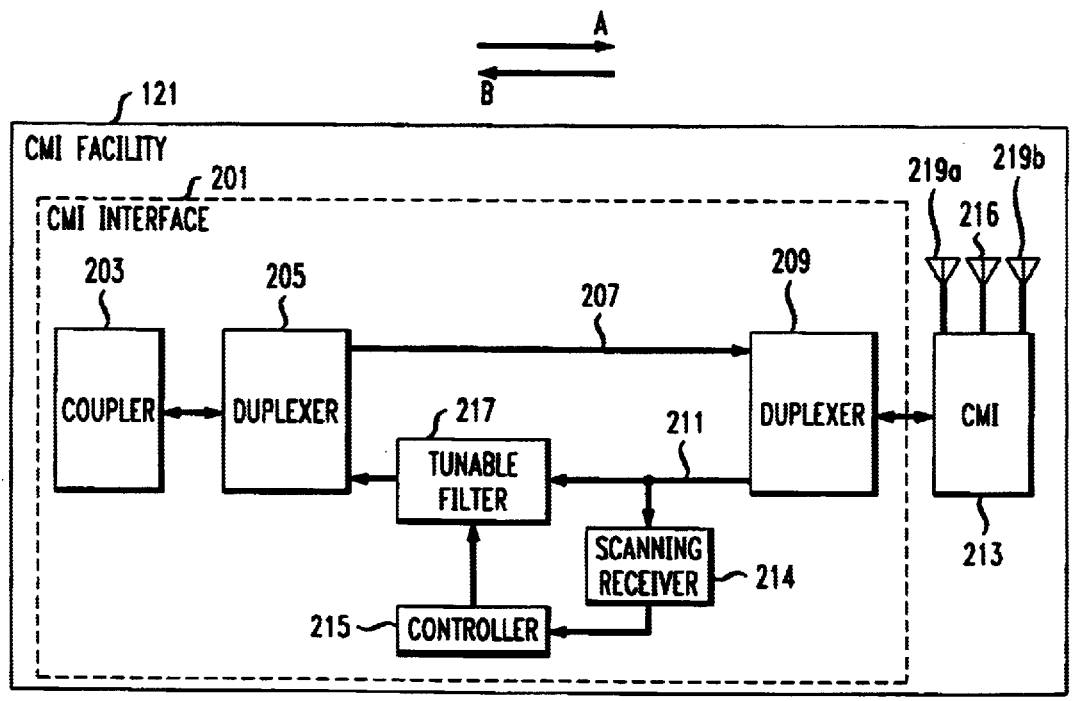
FIG. 2 is a block diagram of a cable microcell integrator facility used in the arrangement of FIG. 1.

To simulcast in a usual manner the forward PCS CDMA signal to the associated sector, more than one CMI facility, e.g., facilities 121 and 123, is used. The specific number of CMI facilities for service of a sector is typically chosen by a skilled operator to meet the needs of a particular application. In this instance, CMI facilities 121 and 123 are structurally identical. Without loss of generality, CMI facility 121 in accordance with the invention is illustrated in FIG. 2 and described below. Facility 123 similarly follows.

Referring to FIG. 2, a portion of the composite RF signal on cable 117 corresponding to the forward PCS CDMA signal is extracted by coupler 203 in CMI interface 201. The remaining portion of the RF signal including the CATV signals continues to travel along cable 117 to reach the CATV subscriber premises, thereby realizing the CATV service. The extracted forward PCS COMA signal traverses link 207, through duplexers 205 and 209 of conventional design, which separate the link in forward direction A from that in reverse direction B.

In a well known manner, CMI 213 frequency-translates the forward PCS CDMA signal into the 1930 MHz–1990 MHz PCS transmit band, and amplifies the resulting signal for radiation through antenna 216. Thus, the radiated signal containing the digital information from the aforementioned communication terminal is receivable by the mobile terminal of the established telephone connection.

In reverse direction B, antennas 219a and 219b both receive a radiated signal containing digital information from the mobile terminal in a PCS receive band ranging from 1850 MHz to 1910 MHz. Antenna 219a is the primary receive antenna, and antenna 219b is used for diversity reasons in the event that the primary receive antenna fails to receive a viable radiated signal. The radiated signal is generated by the mobile terminal in accordance with the PCS standard and aforementioned CDMA technique. The primary receive signal from antenna 219a and the diversity signal from antenna 219b are allotted two 2-MHz wide bands adjacent to each other for a total bandwidth of 4 MHz.

In a well known manner, CMI 213 frequency-translates the primary receive and diversity signals separately to become intermediate frequency (IF) signals, filters the IF signals using conventional IF filters (not shown), and further frequency-translates the IF signals into a return cable band ranging from 5 MHz through 42 MHz. The resulting signals hereinafter are referred to as a "reverse PCS CDMA signal pair." In the above process, a high gain is also imparted to the primary receive and diversity signals when received by the respective antennas to boost their weak signal levels. As a result, the output of CMI 213 invariably includes broadband noise in the return cable band, which is superimposed on the reverse PCS CDMA signal pair. The reverse PCS CDMA signal pair, along with the broadband noise, enters CMI interface 201 through duplexer 209 described before.

Figure 3:
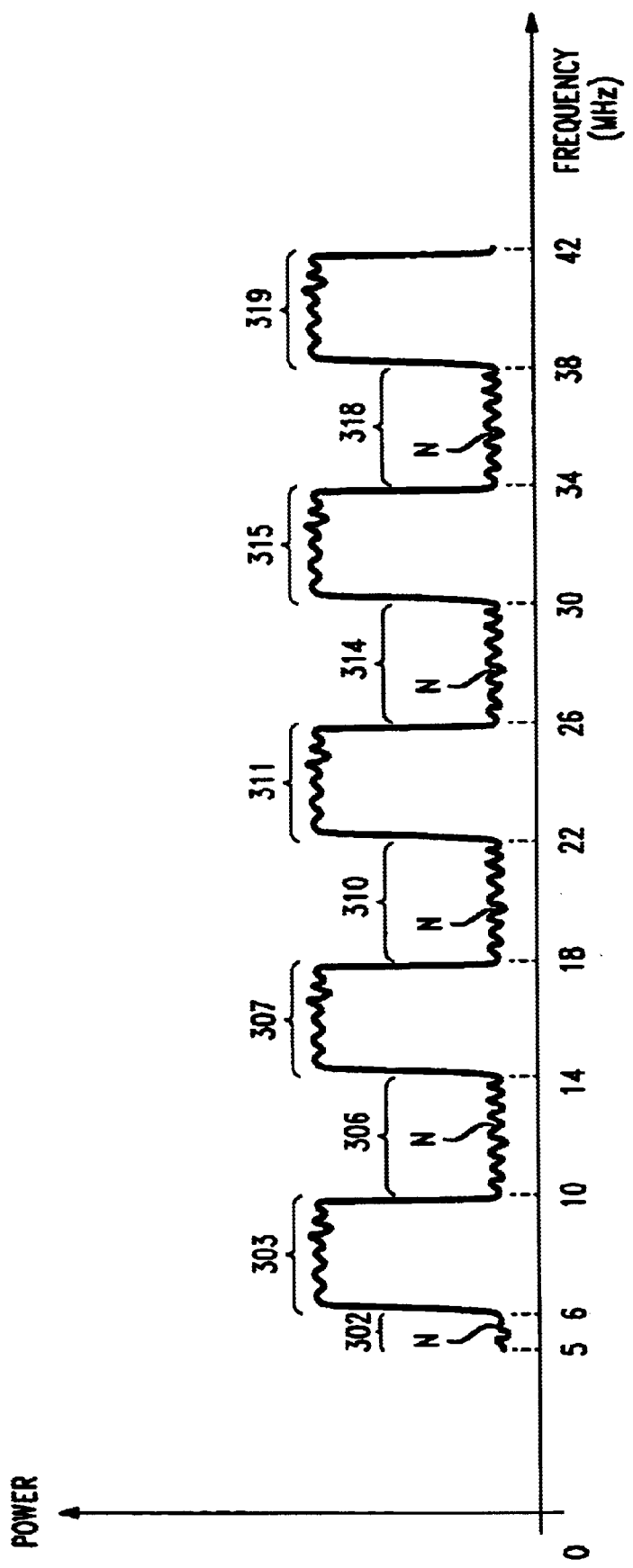
FIG. 3 illustrates a signal power spectrum in a return cable band provided by the cable network arrangement of FIG. 1.

In a conventional manner, the reverse PCS CDMA signal pair may occupy any one of many possible 4-MHz wide signal bands within the return cable band assigned by a skilled PCS operator to implement the PCS. FIG. 3 illustrates a representative signal power spectrum in the 5 MHz–42 MHz return cable band on link 211. As shown in FIG. 3, the return cable band is punctuated with potential signal pairs occupying the many possible signal bands, e.g., signal bands 303, 307, 311, 315 and 319, leaving gap band 302 and gap bands 306, 310, 314 and 318 between the signal bands unused. However, these gap bands are abandoned in the prior art as they are corrupted by the aforementioned broadband noise, denoted N.

Recently, a number of applications emerged, known as "return service applications", which require bandwidth in the return cable band to provide, e.g., pay per view services, Internet access, interactive games, etc. In the prior art, a portion of the return cable band for the PCS is severed to accommodate the return service applications, thereby undesirably curtailing the flexibility of assigning the aforementioned PCS signal bands, limited to within the remaining narrower band.

However, I have recognized that because of use of the CDMA technique, even though the reverse PCS communication is active, the signal spectrum of the reverse CDMA PCS signal pair, including its power level, resembles that of pure channel noise as if no communication were going on. In other words, a pure-channel-noise-like signal always appears in a signal band being used, regardless of whether the reverse PCS communication is active. The pure-channel-noise-like signal hereinafter is referred to as a "pedestal noise signal." I have also recognized that the power level of the pedestal noise signal is significantly higher than that of the broadband noise.

In accordance with the invention, the pedestal noise signal on link 211, which comprises a reverse PCS CDMA signal pair in this instance, is detected by scanning receiver 214 which is a conventional frequency variable power detector, based on a significant rise in the power level in a transition from the broadband noise to the pedestal noise signal in the 5 MHz–42 MHz return cable band. Specifically, receiver 214 scans through the return cable band for the pedestal noise signal and identifies the signal band which it occupies. The identity of the occupied signal band is conveyed by scanning receiver 214 to controller 215. The latter accordingly transmits a control signal to adjust tunable filter 217 to have its passband which is 4 MHz wide coincide with the identified signal band, which is also 4 MHz wide as mentioned before. Filter 217 may include a variable capacitor such as a conventional varactor whose capacitance, and thus the delimiting (i.e., beginning and end) frequencies of the passband, vary in response to the control signal provided by controller 215. Accordingly, filter 217 filters out the broadband noise outside the identified signal band. As a result, gap bands 302, 306, 310, 314 and 318 are devoid of broadband noise.

Advantageously, with the invention, the noise-free gap bands can be allocated to the aforementioned return service applications, without adversely affecting the existing PCS. In fact, the reverse PCS CDMA signal pair on link 211 passes tunable filter 217 unaffected. The signal pair proceeds to coupler 203 through duplexer 205 described before. Coupler 203 couples the signal pair with other return service application signals from subscriber premises on cable 117 in FIG. 1. These signals may represent information concerning, e.g., selection of certain pay per view movies in a pay per view service, and populate one or more of the aforementioned gap bands allocated thereto, in accordance with the invention. The resulting coupled signal is an RF composite signal, and converted by fiber node 103 to an optical signal. The latter traverses optical fiber 113*b* to headend interface 111 where the optical signal is converted back to the RF composite signal. The portion of the composite signal corresponding to the reverse PCS CDMA signal pair is routed by interface 111 to HIC 109. The remaining portion corresponding to the return service application signals is routed by interface 111 to the appropriate processors, thereby realizing the return service applications.

Upon receiving the return PCS CDMA signal pair, HIC 109 separates the primary receive signal from the diversity signal therein, and frequency-translates each signal into the 1850 MHz–1910 MHz PCS receive band. The resulting signals containing the information from the mobile terminal of the established telephone connection are then sent to base station 106 for further processing. In a conventional manner, base station 106 then transmits the information to the communication terminal on the other end of the connection, thereby realizing the PCS.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, in the disclosed embodiment, the return cable band of cable network arrangement 100 ranges from 5 MHz to 42 MHz. However, the invention applies even if the return cable band is translated to a different frequency range. In that case, it will be appreciated that some or all of the reverse signals in the return cable band will accordingly be frequency-translated to the new frequency range.

Finally, arrangement 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. A system for communicating a signal through one of a plurality of signal bands in a communication band, at least one subband other than the plurality of the signal bands in the communication band being corrupted by noise, the system comprising:

a filter having an adjustable passband;

a detector for identifying said one of the plurality of the signal bands; and a controller for adjusting the adjustable passband of the filter to substantially coincide with the identified said one of the plurality of the signal bands.

2. The system of claim 1 wherein the communication band is provided by a cable network.

3. The system of claim 2 wherein the plurality of signal bands are used for a personal communications service (PCs).

4. The system of claim 2 wherein the communication band is a return cable band, and the subband is used for a return service application.

5. The system of claim 1 wherein the signal represents information which is formatted in accordance with a code division multiple access (CDMA) scheme.

6. The system of claim 1 wherein the detector identifies said one of the plurality of signal bands based on a difference between a power level of the signal and that of the noise.

7. A cable network arrangement including a headend, at least one signal being transmitted in the arrangement toward the headend through a communication band, the communication band being corrupted by noise, the arrangement comprising:

a detector for scanning the communication band to identify a location of a signal band therein which is occupied by the signal; and an adjustable passband filter for reducing the noise and allowing the signal to pass therethrough substantially unaffected based on knowledge of the location of the signal band, the passband being adaptively adjusted to correspond to the location in the communication band of the signal band occupied by the signal being transmitted toward the headend.

8. The arrangement of claim 7 wherein the signal 2 band is used for a PCS.

9. The arrangement of claim 7 wherein the signal represents information which is formatted in accordance with a CDMA scheme.

10. The arrangement of claim 7 wherein the detector identifies the location of the signal band based on a difference between a power level of the signal and that of the noise.

11. The arrangement of claim 7 wherein the passband is adjusted to substantially coincide with the signal band.

12. A method for use in a system for communicating a signal through one of a plurality of signal bands in a communication band, at least one subband other than the plurality of the signal bands in the communication band being corrupted by noise, the system including a filter having an adjustable passband, the method comprising the steps of:

identifying said one of the plurality of the signal bands; and adjusting the adjustable passband of the filter to substantially coincide with the identified said one of the plurality of the signal bands.

13. The method of claim 12 wherein the plurality 2 of signal bands are used for a PCS.

14. The method of claim 12 wherein the signal represents information which is formatted in accordance with a CDMA scheme.

15. The method of claim 12 wherein said one of the plurality of signal bands is identified based on a difference between a power level of the signal and that of the noise.

16. A method for use in a cable network arrangement including a headend, at least one signal being transmitted in the arrangement toward the headend through a communication band, the communication band being corrupted by noise, the arrangement also including an adjustable filter for reducing the noise, the method comprising the steps of:

scanning the communication band to identify a location of a signal band therein which is occupied by the signal; and based on knowledge of the location of the signal band, adjusting the adjustable filter to exhibit a passband corresponding to the location in the communication band of the signal band occupied by the signal being transmitted toward the headend.

17. The method of claim 16 wherein the signal band is used for a PCS.

18. The method of claim 16 wherein the signal represents information which is formatted in accordance with a CDMA scheme.

19. The method of claim 16 wherein the location of the signal band is identified based on a difference between a power level of the signal and that of the noise.

20. A system for communicating a signal through a communication band, said communication band including a plurality of signal bands interspersed with a plurality of sub-bands, respectively, said sub-bands being corrupted by noise, the system comprising:

a filter having an adjustable passband;

a detector for identifying one of the plurality of the signal bands having a non-noise first signal;

a controller for adjusting the adjustable passband of the filter to pass the identified signal band while also substantially removing the noise in at least one of the sub-bands adjacent to said identified signal band; and a coupler to assign a second signal to the at least one adjacent sub-band.

21. The system of claim 20, wherein said communication band represents a return cable band;

wherein said first signal represents at least one wireless communications signal; and wherein said second signal represents at least one return service application signal.

22. In a communications system including a filter having an adjustable passband, a method of communicating a signal through a communication band, said communication band including a plurality of signal bands interspersed with a plurality of sub-bands, respectively, said sub-bands being corrupted by noise, the method comprising:

identifying one of the plurality of the signal bands having a non-noise first signal;

adjusting the adjustable passband of the filter to pass the identified signal band while also substantially removing the noise in at least one of the sub-bands adjacent to said identified signal band; and coupling a second signal to the at least one adjacent sub-band.

23. The method of claim 22, wherein said communication band represents a return cable band;

wherein said first signal represents at least one wireless communications signal; and wherein said second signal represents at least one return service application signal.

24. A method for use in a system for communicating a signal through one of a plurality of distinct signal bands in a communication band, at least one subband other than the plurality of the signal bands in the communication band being corrupted by noise, the system including a filter having an adjustable passband, the method comprising the steps of:

identifying said one of the plurality of distinct signal bands; and adjusting the adjustable passband of the filter to substantially coincide with the identified said one of the plurality of distinct signal bands.

25. The method of claim 24, wherein the distinct signal bands are substantially non-overlapping.

* * * * *